Patented Jan. 31, 1928.

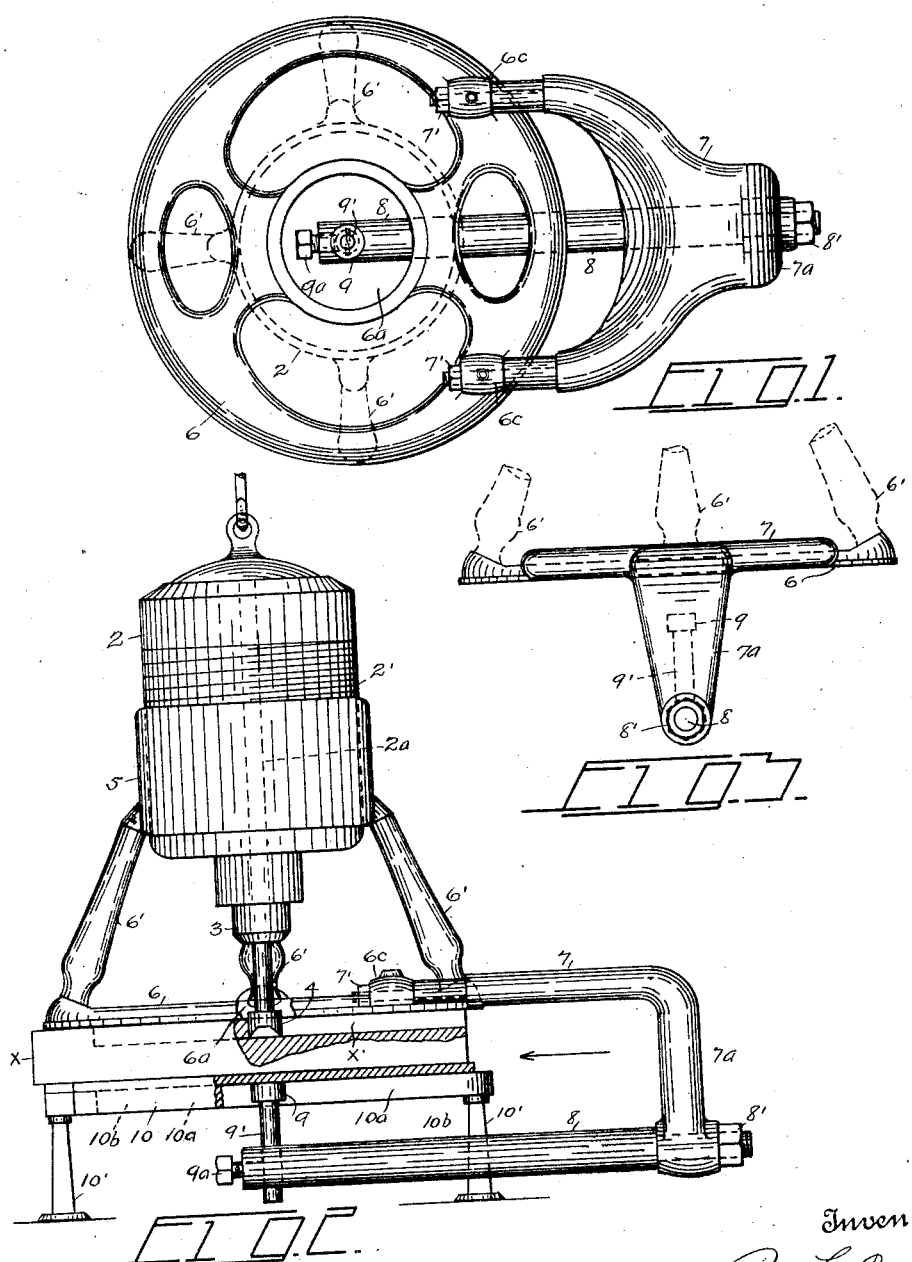

1,657,659

UNITED STATES PATENT OFFICE.

RAY L. CARTER, OF PHOENIX, NEW YORK.

GUIDE FOR ROUTER BITS.

Application filed August 2, 1926. Serial No. 126,659.

This invention relates to an attachment for routing machines, and has particular reference to a combined support and tool-guide for routers employed for performing certain work.

The object of the invention is to provide a base for adjustably supporting a motor-driven router, the said base having a plane bottom that rests upon and moves over a surface of the work, and having a central opening through which the cutting tool plays and may be observed. The primary object of the invention is to provide novel means whereby the guiding and directing of the cutting tool may be effected from a convenient point below the router base, the said means consisting of a bracket having an angular body, which is detachably secured to and extends laterally for a considerable distance from the base, a portion of said bracket extending below the bottom plane of the base, and supporting an arm that extends inwardly radially past the center of the base and supports a guide-roller having the same diameter as the routing bit, and whose axis coincides with the axis of said bit, the said roller being adjustable axially towards and away from the bit, and adapted to traverse pattern guide-ways or grooves formed in the bottom face of any suitable templet, for directing the routing bit to trace and cut identical gains or grooves in a piece of wood or other work mounted above the templet; the arrangement of the guiding means being such that the routing machine may be freely propelled manually in all directions in the plane of the top surface of the work, for routing intricate, tortuous of plain patterns, without requiring adjustment or alteration of the machine or the guiding parts during the performance of the work.

I attain these objects by the means set forth in the detailed description which follows, and as illustrated by the accompanying drawing, in which—

Figure 1 is a top plan view of the router base, to which the improved guiding mechanism is applied. Fig. 2 is a front side elevation of the same with parts broken away, showing the routing machine mounted upon a piece of work, the latter being supported by a templet; also showing the routing bit in the act of cutting a groove in the top face of the work that exactly corresponds to a pattern formed in the bottom face of the templet and traversed by the guide-roller. And Fig. 3 is an end elevation of the guiding attachment.

In the drawing, 2 represents an ordinary electric motor having a threaded exterior 2', and an armature shaft 2ª, upon which may be mounted any suitable chuck 3, to which bits of different shapes and kinds, as 4, may be interchangeably secured for effecting various cuts. The motor 2 is usually supported by a cylindrical holder 5, which may be internally threaded for adjusting the motor and tool axially. The holder 5 is supported and suitably spaced above and clear of a circular base 6, by similar legs 6', which may also serve for handles, by which the operator manipulates the machine. The base 6 is formed with a central opening 6ª through which the bit 4 plays, and the base has a smooth plane bottom that usually engages a surface of the work, as $x$ (see Fig. 2). At one side, the top of the base is formed with similar raised horizontal sockets 6ᶜ, that parallel each other, and in which may be inserted the arms of a forked bracket 7, the latter being held rigidly in place by any suitable means, as by nuts 7'. The bracket 7 extends a considerable distance beyond the periphery of the base, and its outer extremity is formed with a depending arm 7ª, whose free end is perforated to receive a guide-rod 8, which is detachably held in place by a nut 8'. The rod 8 extends inwardly radially beneath the body 7 and the base 6, past the center of the base, and its free end supports a guide member, which preferably comprises a roller 9, the latter being pivotally mounted upon a vertically disposed shank or post 9', which passes diametrically through the said rod, and may be held in various adjusted positions, by means of a set-screw 9ª. The roller 9 is preferably the same diameter as the bit 4, and the axis of said roller preferably coincides exactly with the axis of the bit, the said roller and the post 9' being adjustable vertically towards and away from the bit, for enabling the bit to rout or cut the top surface of work, as $x$, of varying thickness. For the purpose of illustrating the arrangement and operation of the present device, the work $x$ is shown mounted upon a rigid templet or guide shown conventionally at 10, and which may be elevated above a bench or other support, by means of legs 10' (see Fig. 2). The guiding and directing of the bit 4, is accomplished in a simple and accurate manner, by means of guide-ways that are formed in the bottom face of the templet, such a guide-way being shown at 10ª, in Fig. 2, wherein the roller 9 is being moved in the direction of the arrow along said way, and is directing and guiding the bit 4, which is shown in the act of cutting an identical pattern or groove, as $x'$, in the top face of the work. The dotted lines in Fig. 2, indicate the uncut portion of the groove $x'$, as well as the corresponding portion of the guide-way 10ª. The guide-way 10ª is preferably formed with smooth vertical guide-faces, as 10ᵇ, over which the roller 9 travels frictionally, and as the pattern 10ª is usually broader than the diameter of the bit 4 and the roller 9, the operator maneuvers the router in a manner to cause the roller to traverse one guiding surface 10ᵇ throughout its entire length, and then shifts the machine for causing the roller 9 to traverse the opposite guide face 10ᵇ, during the return movement of the machine. This completes the tracing of the pattern. In the case of relatively large patterns, in which the guide faces 10ᵇ are more widely spaced, the operator repeats the forward and backward movements of the router until the groove $x'$ is entirely cut. Upon the completion of the routing, the machine should be moved in the direction to withdraw the roller 9 from the guide-way 10ª, after which the machine may be removed from the work $x$. In case the router is required for ordinary routing work, where patterns of the character herein shown are not available or necessary, the bracket 7 may be readily and quickly detached from the base 6, by simply removing the nuts 7'.

By providing guide-ways as 10ª, of the exact size and shape of the pattern to be reproduced in the work by the bit 4, and by providing the coinciding guide member 9 of exactly the same diameter as the bit, and disposing the guiding means comprising the member 9 and the pattern-guides 10ª below the plane of the work, thereby leaving the surface to be routed clear of obstructions, enables the operator to freely maneuver the machine and to constantly observe the execution of the bit. Furthermore, the disposing of the guiding means below the work, not only tends to quicken the work of the router, but enables an operator of ordinary skill to accurately trace and cut identical patterns, as well as to repeat the said operations in a reliable and ready manner.

Having thus described my invention, what I claim, is—

In a router device, a templet formed to receive the work on its upper face and having a guide on its under face, a portable base formed to movably seat on the upper face of the work so as to be solely supported thereby, a router carried by the base and extending below the latter to engage the work, an upwardly extending guide member engaging the templet guide, and means to support the guide member from the base so as to partake of all of the movements of the base.

In testimony whereof I affix my signature.

RAY L. CARTER.